United States Patent [19]

Rindoks

[11] Patent Number: 5,238,126
[45] Date of Patent: Aug. 24, 1993

[54] PORTABLE ENGINE MOUNTING STAND

[76] Inventor: Marian M. Rindoks, 1100 - 170th St., Hammond, Ind. 46324

[21] Appl. No.: 826,053

[22] Filed: Jan. 27, 1992

[51] Int. Cl.⁵ ............................................. A47F 7/00
[52] U.S. Cl. ..................................... 211/13; 206/319; 211/194
[58] Field of Search .................... 211/194, 13, 195; 206/319, 599, 600

[56] References Cited

U.S. PATENT DOCUMENTS

| | | | |
|---|---|---|---|
| 4,098,409 | 7/1978 | Massey | 206/319 X |
| 4,403,697 | 9/1983 | Forshee | 206/319 X |
| 4,406,366 | 9/1983 | Forshee | 206/319 |
| 4,412,615 | 11/1983 | Forshee | 206/319 |
| 4,735,310 | 4/1988 | Lemery et al. | 206/319 |
| 4,773,547 | 9/1988 | Bell | 211/194 |
| 4,793,584 | 12/1988 | Etchell | 211/194 X |
| 5,154,286 | 10/1992 | Gits | 206/319 X |

Primary Examiner—Robert W. Gibson, Jr.
Attorney, Agent, or Firm—Alan B. Samlan

[57] ABSTRACT

A stackable portable engine mounting stand for supporting an engine above the floor. The engine mounting stand has a pair of vertically disposed front and rear legs firmly fastened to the engine block by means of bolts passing through the legs and received in threaded holes within the engine block. The bottoms of the legs are mounted on rollers to permit the engine mounting stand to be moved about on the floor. In one of the embodiments the tops of the legs have protrusions which are received in the bottom of legs of a stationary engine mounting stand. This stand is similarly attached to an engine block. By means of a second stationary engine stand up to three engines can be stacked vertically one above the other.

16 Claims, 4 Drawing Sheets

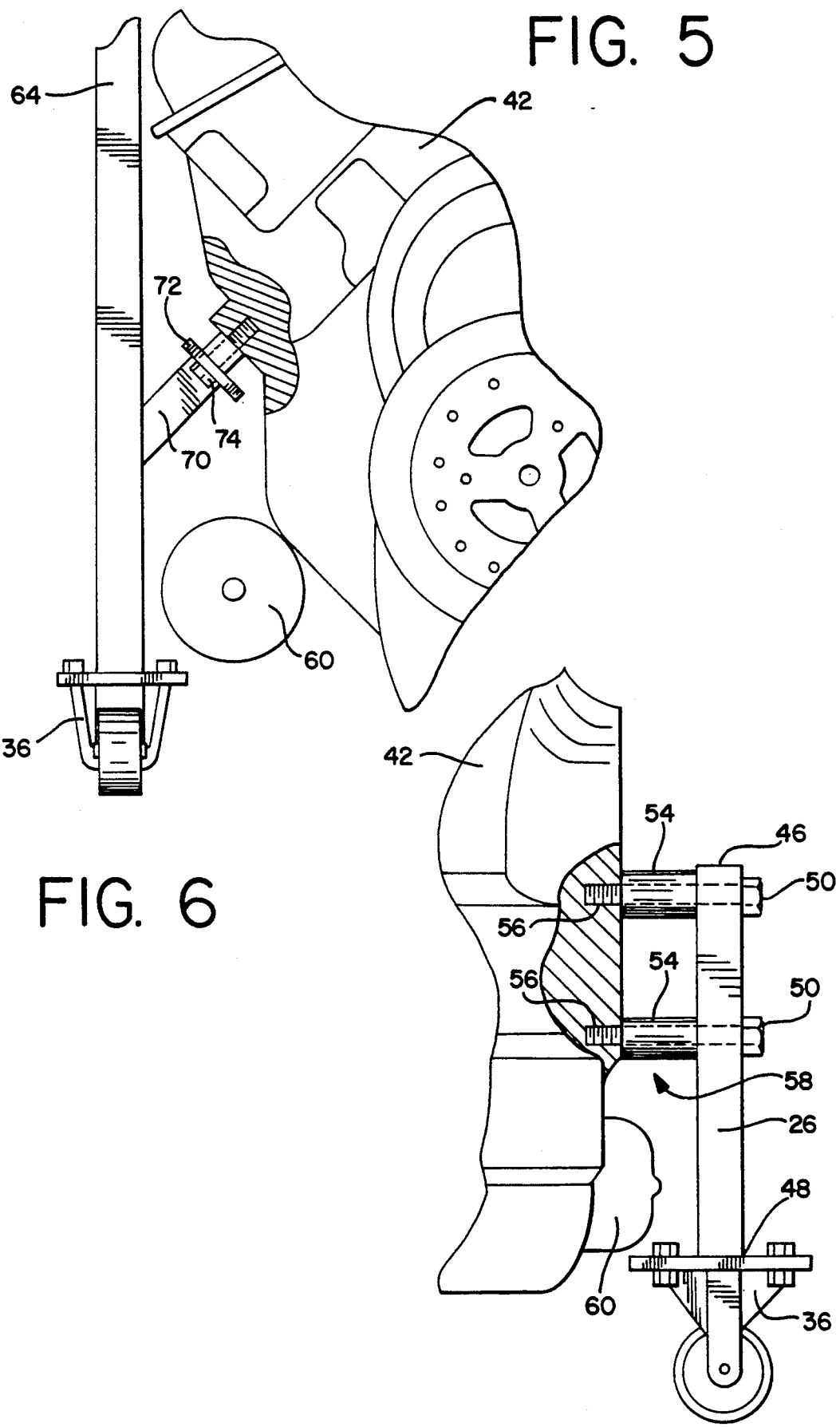

PORTABLE ENGINE MOUNTING STAND

BACKGROUND AND SUMMARY OF THE INVENTION

This invention relates to an engine mounting stand and more particularly to an engine mounting stand which can vertically stack two or more engines. Various types of engine supporting frameworks have been previously invented. One engine test stand is illustrated in U.S. Pat. No. 4,511,112 which shows a moveable frame on which an engine is mounted at a location remote from the test station which then may be moved into operative relationship to a dynamometer for testing. Another engine mounting frame is illustrated in U.S. Pat. No. 4,461,447 which illustrates a framework on which an engine may be mounted. However, neither of these two patents illustrate a framework which allows the engine to be easily rolled to another location for testing or storage. Also neither shows a framework to vertically stack engines.

An example of a portable test stand is illustrated in U.S. Pat. No. 4,804,162 which is used to receive an engine and its mount by lowering the same onto a cradle support system. The engine can then be wheeled away from the vehicle. U.S. Pat. No. 4,932,628 illustrates a portable engine test stand to support and monitor a running engine. U.S. Pat. No. 4,848,717 illustrates another form of portable engine testing stand. U.S. Pat. No. 4,971,286 illustrates a relatively simple supportive framework having handle assemblies mounted to one end of the frame for lifting, carrying, guiding, and pushing the framework on which the engine is mounted. Although many of these designs provide for a framework on which the engine can be mounted, none of them provide a stackable framework on which two or more engines can be vertically stacked to save space. Furthermore, many of these prior art devices are not sufficiently stable to safely store or hold an engine while it is being moved. Accordingly, many could not be used to stack two or more engines due to their inherent design which does not allow stackability or due to the fact that they are not stable enough to support more than one engine in vertical alignment.

Most of the previously designed devices have attempted to accommodate numerous types of models of engines. However, requiring such great versatility from an engine mounting stand has resulted in devices which are not suitable for securely holding two or more engines in a stackable relationship. The reason is that a rigid framework securely attached to the engine is necessary in order to provide the stability required for multiple stacking of engines.

In the present invention, a portable engine mounting stand is comprised of a pair of vertically oriented front and rear legs. Each leg is securely fastened to the engine by screws. At the rear of the engine the screws pass through the vertical legs and into the threaded holes in the engine block which normally receive the transmission. A spacer keeps the rear of the engine spaced apart from the vertical rear legs of the engine mounting stand. This provides a clearance for the starter when the engine is test started. The front legs are attached towards the front of the engine but along the side. Screws pass through a mounting plate attached to the front legs and the mounting plate is attached to the engine where the motor mounts would normally be located. In this manner, all of the legs are securely fastened by the screws to the engine block. The bottoms of the legs have wheels or rollers so that the engine can be easily moved about on the floor.

In another embodiment, the tops of each of the legs of the portable stackable engine mounting stand extend up above the top of the engine. A stationary stand is adapted to be mounted on top of the portable stackable stand. The bottoms of the legs of the stationary stand are adapted to be received on the top of the legs of the stackable frame such that the second engine is vertically stacked above the first engine. A similar arrangement can be provided for stacking a third engine above the second. By means of adapter plates attached to the vertical legs, different engines can be fastened to the vertically disposed legs.

The invention provides for a singular engine mounting stand or stackable engine mounting stands adapted to be mounted one on top of the other to provide for the storage of up to three engines in the same floor space as a single engine. Either embodiment uses the engine itself as a piece of the framework to provide structural support. As a result, the invention uses fewer structural supports than prior art devices.

OBJECTS AND ADVANTAGES OF THE INVENTION

An object of the present invention is to provide a portable engine mounting stand which is securely mounted to the engine block. Related to this object is the object of providing a portable engine mounting stand which holds and supports an engine in such a manner so that it can be tested without the engine mounting stand interfering with the testing.

Another object is to provide a stackable portable engine mounting frame on which two or more engines can be vertically stacked one above the other to provide for multiple engine storage in the floor space normally used for a single engine.

Yet another object is the object of providing a safe multiple engine mounting stand which is stable and will not easily tip.

A related object is the object of providing a multiple engine mounting stand which provides that the engine stands and engines can be placed alongside each other for testing or stacked for storage of one on top of the other, depending upon the user's needs.

Yet another object is the object of providing an engine mounting stand which by the use of adaptor plates can be used to support various engines from different manufacturers.

Still another object is to provide an engine mounting stand in which the engine itself provides structural support to the stand by acting as a frame member. An advantage of this is that it allows the engine mounting stand to be manufactured from a minimum number of frame elements.

Other objects and advantages of the invention will become apparent from the following description taken in conjunction with the accompanying drawings wherein are set forth by way of illustration and example, certain embodiments of this invention.

BRIEF DESCRIPTION OF THE DRAWINGS

FIG. 5 is an enlarged view with portions removed and partially in cross-section of the portable stackable stand showing the means by which the front tubular leg and angular arm are connected by a threaded fastener to the engine block.

FIG. 6 is an enlarged view with portions removed and partially in cross-section showing the means by which the rear tubular leg is connected to the rear of the engine block and illustrating the clearance gap between the rear tubular leg and engine block to permit test starting of the engine.

DETAILED DESCRIPTION OF THE PREFERRED EMBODIMENTS

Figure 1:
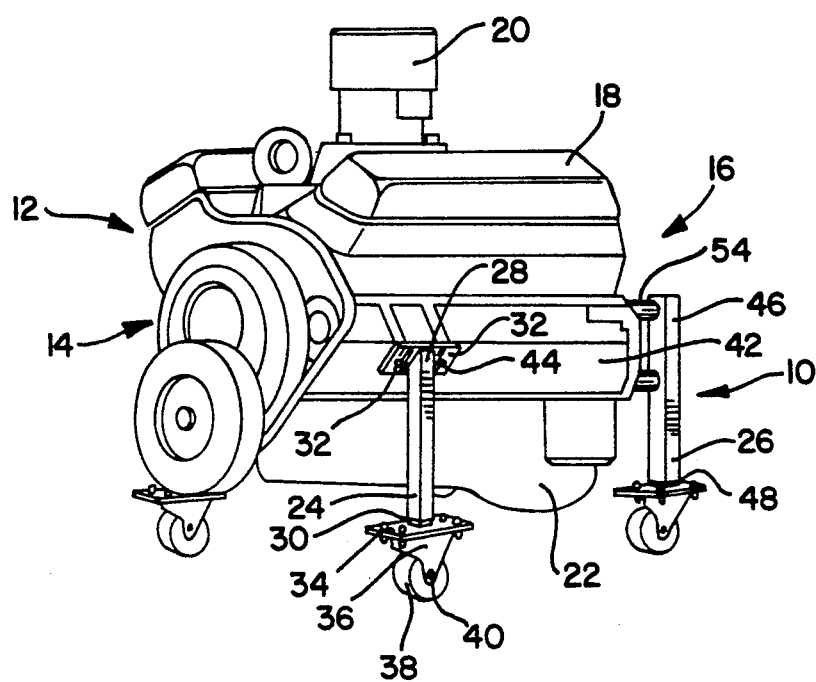
FIG. 1 is a perspective view of a portable single engine mounting stand of the present invention showing an engine mounted to the stand.

Turning first to FIG. 1, there is illustrated a portable engine mounting stand 10 of the present invention. The engine mounting stand 10 is designed for receiving and supporting an engine 12 in an upright position above the ground. The engine 12 has a front 14 and a rear 16. There are valve covers 18 and a carburetor 20 protruding up from the top of the engine. An oil pan 22 extends down below the engine. The portable engine mounting stand 10 comprises a pair of front tubular legs 24 and a pair of rear tubular legs 26. The front tubular legs 24 have top and bottom ends 28 and 30 respectively. At the top end 28 there is mounted an angular plate 32 which is placed at an angle with respect to the upstanding front tubular leg 24. The bottom 30 of the tubular leg 24 is attached to a planer support 34 which has a caster 36 below it. The caster has a wheel 38 mounted on a shaft 40. The caster 36 is allowed to rotate so that the stand can be moved about on the floor. The engine 12 also has an engine block 42.

The angular plate 32 is mounted to the engine block 42 by means of bolts 44 passing through holes in the angular plate 32 and being received in threaded passageways in the engine block 42. The holes in the angular plate 32 are positioned so that they are in alignment with complimentary holes in the engine block 42. The holes in the engine block 42 are the holes which receive the bolts for the motor mounting brackets which mount the engine to the automobile frame. When the engine block 42 is removed from the vehicle, the motor mounts are removed and these threaded passageways are available to receive the bolts 44. In this manner, the front tubular legs 24 are securely fastened through the angular plate 32 to the engine block 42.

The rear tubular legs 26 must also be fastened to the engine block 42. This is more clearly illustrated in FIG. 6. The rear tubular leg 26 has a top 46 and a bottom 48. The bottom 48 is mounted to a caster 36 similar to that which was previously described for the front tubular legs 24. The rear tubular legs 26 are mounted to the engine block 42 by means of bolts 50 and 52. The bolts pass through the rear tubular legs 26, through spacers 54, which are placed between the rear tubular leg and the rear of the engine 16, and are then received in a threaded passageway 56 within the engine block. The threaded passageways 56 are the passageways which receive mounting bolts to mount the transmission to the engine block 42. Thus when the transmission is removed from the engine block 42 the passageways 56 are available to be used by the present invention. The purpose of the spacers 54 is to provide a clearance gap 58 between the rear tubular legs 26 and the engine block 42. This clearance is necessary to provide clearance for a starter 60 so that the engine can be test driven while being supported by the portable engine mounting stand 10.

Figure 2:
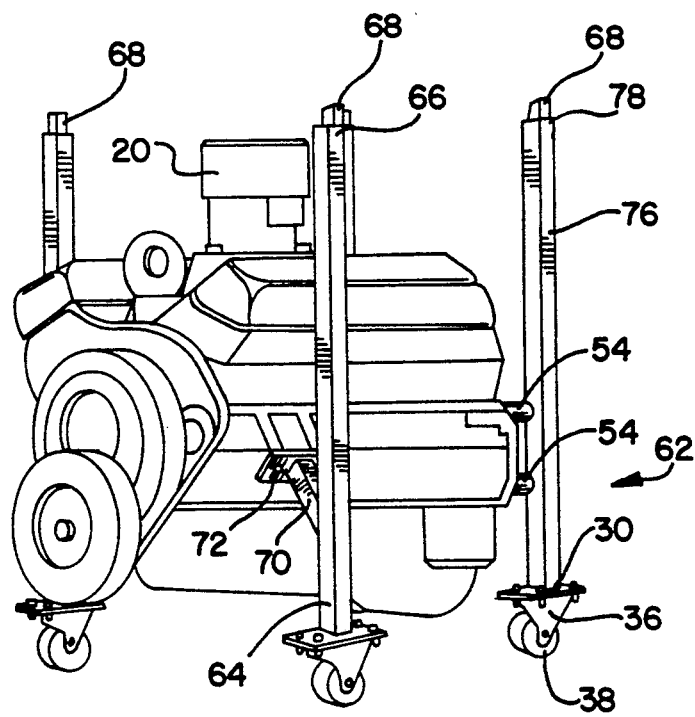
FIG. 2 is a perspective view of a portable stackable engine mounting stand showing one engine mounted to the stand.

Turning to FIG. 2 there is illustrated a stackable portable engine mounting stand 62 which is an alternative embodiment of the portable engine mounting stand of FIG. 1. There are a pair of front tubular legs 64 having the bottom ends 30 attached to the planer support 34 with a caster 36 and wheel 38 identical to the same components as illustrated in FIG. 1. Where the components are identical, the same reference numerals are used. There is a top end 66 which extends up above the top of the carburetor 20. Protruding up from the top end 66 are locating posts 68. There is also an angular arm 70 which extends at an angle out from the upstanding front tubular leg 64 and which is shown more clearly in the enlarged view of FIG. 5. There is a removable angular plate 72 which is asapted to be received within the angular arm 70. There are a pair of holes on either side of the angular plate 72 through which pass mounting bolts 74. The mounting bolts 74 are adapted to be received within receiving holes within the engine block 42 as described in the embodiment illustrated in FIG. 1.

The American manufacturers of engines have the position of the motor mount holes identical in most of their engines. Generally speaking, there are only three different positions for the motor mount holes. Accordingly, applicant has provided three different angular plates 72 which have their holes aligned with the motor mounting holes. By having the angular plate 72 removable from the angular arm 70, the user of the stackable portable engine mounting stand need only remove the plate 72 and replace it with a different plate adapted for a different engine. The plate can be made removable by having an arm perpendicular to the face of the plate extend down into the tubular angular arm 70. In this way the front tubular legs 64 and angular arm 70 need not be changed but are adaptable for use on all major engines. Should different positioned motor mounting holes be used on other engines, it is easy to provide alternative angular plates 72 to align with these holes.

There are also a pair of rear tubular legs 76 similar to the rear tubular legs 26 of the device shown in FIG. 1. The difference is that the rear tubular legs 76 in the stackable engine mounting stand 62 have a top end 78 protruding up above the top of the carburetor 20 and at substantially the same height as the top end 66 of the front tubular legs 64. There are also locating posts 68 at the top end 78.

The rear tubular legs 76 are provided with several bolt holes located towards the lower portion of the legs 76. The purpose for multiple holes is that the engine block 42 has threaded holes in the rear 16 into which the transmission is mounted. As several types of transmissions may be mounted to the engine block 42 the possibility for different positions of the mounting holes arises. Accordingly, so that only one set of rear tubular legs 76 are required, several holes positioned at different places along the rear tubular leg 76 will provide for adapting the mounting of the legs to holes receiving any of the standardly available transmissions. In this manner the bolts 50 will be passed through the appropriate set of holes in the rear tubular leg 76 so that they can be received by the threaded passageways 56 in the rear of the engine 16.

Figure 3:
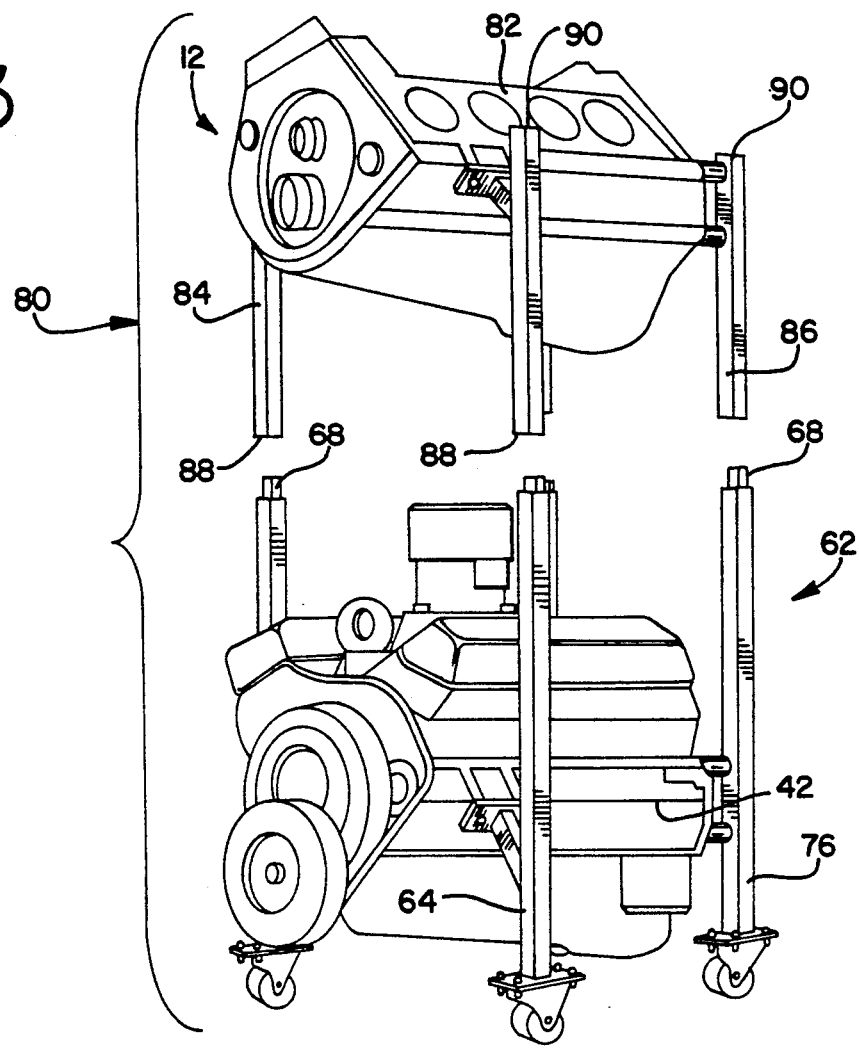
FIG. 3 is a perspective view of the stackable engine mounting stand showing one engine mounted to the portable stand with a second engine mounted to a stationary stand, positioned above the first engine and ready to be lowered down onto the portable stand.
Figure 4:
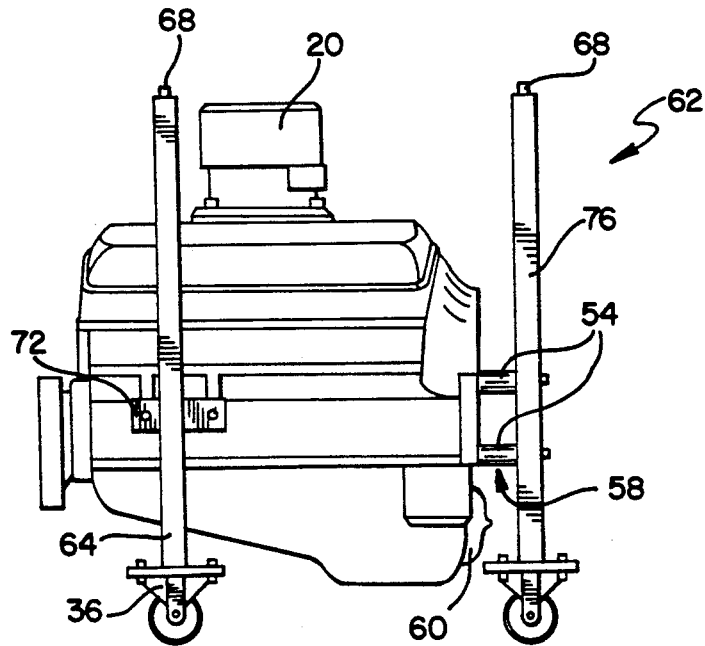
FIG. 4 is a side view of the stackable stand illustrated in FIG. 2 showing the engine mounted to the portable stackable stand.

Turning next to FIG. 3 there is illustrated the stackable portable engine mounting stand 62 supporting the engine 12. A stationary engine mounting stand 80 having a second engine block 82 is illustrated directly above the stackable engine mounting stand 62. The stationary engine mounting stand 80 has a pair of front legs 84 and a pair of rear legs 86 which are similar to respectively the front legs 64 and rear legs 76. However, each of these legs 84, 86 have a bottom 88 with a hollowed out portion which is adapted to receive the locating posts 68 of the engine mounting stand 62. Each of the legs 84 and 86 when mounted to the engine block 82 will be in vertical alignment with the legs 64 and 76 respectively. With the posts 68 received in the bottom 88 of the tubular legs, the second engine block 82 is securely stacked above the first engine block 42. The stationary engine mounting stand 80 has the front legs 84 and rear legs 86 fastened to the engine block 82 in substantially the same manner as the first engine block 42 was mounted to its mounting stand 62.

Figure 7:
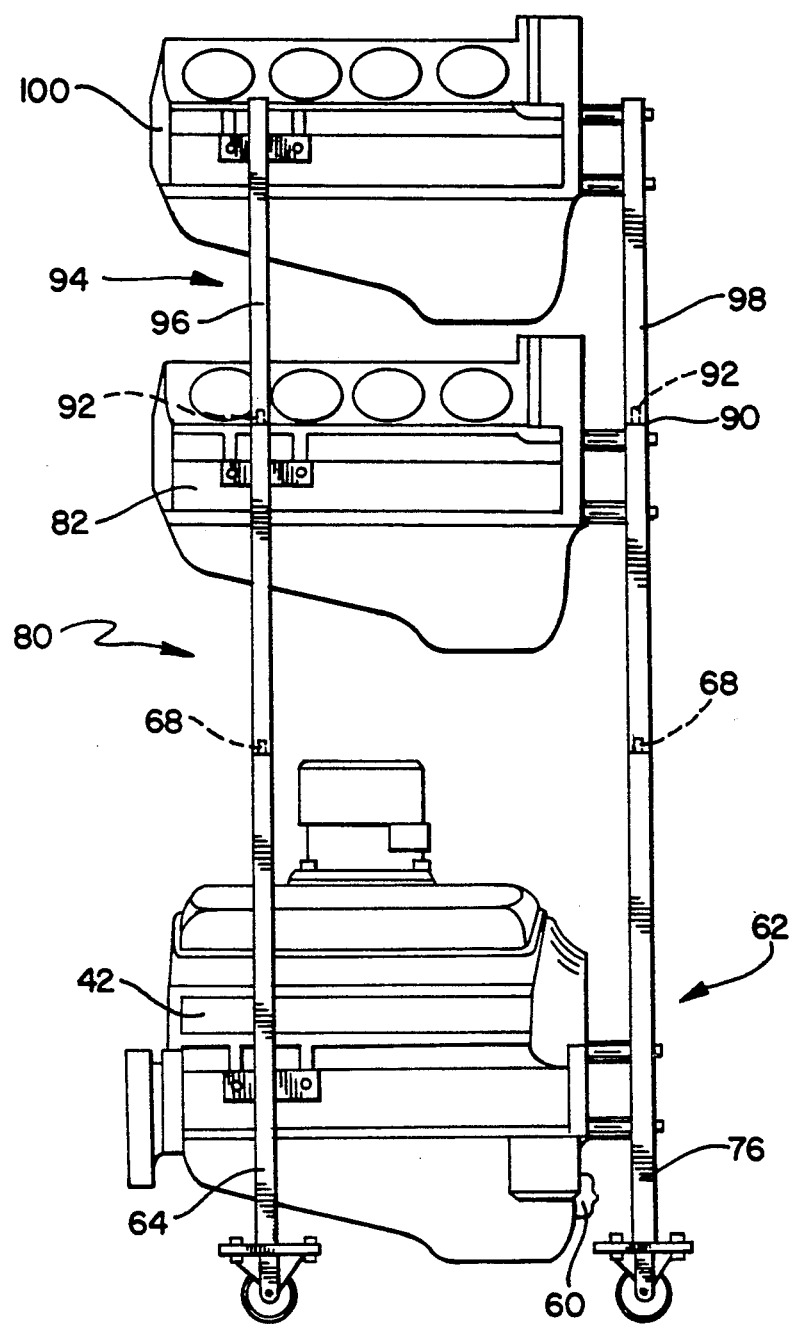
FIG. 7 is a side view of another alternate embodiment of a portable stackable stand in which three engines are vertically stacked one above the other.

Turning to FIG. 7 there is illustrated a second embodiment in which three engines are mounted one on top of the other. In this configuration the stationary engine mounting stand 80 has locating posts 92 at top ends 90 of the tubular legs. A second stationary engine mounting stand 94 has a pair of front and rear tubular legs 96, 98 which have hollowed out portions at their bottoms. These receive the locating posts 92 such that the second stationary engine mounting stand 94 can be stacked above the stationary mounting stand 80. The mounting legs 96 and 98 are attached to an engine block 100 in the same manner as previously described for the other engine mounting stands.

An important feature of each of the engine mounting stands is that the engine block itself gives structural strength to the engine mounting stand. The engine block acts as a rigid frame member connecting the individual legs to the engine block. This results in a material savings for each mounting stand as horizontal cross bracing is not required because the engine block serves this purpose.

Thus there has been provided in accordance with the invention a stationary and portable engine mounting stand which further provides for a stackable engine mounting arrangement that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly it is intended to embrace all such alternatives, modifications, and variations as fall within the spirit and broad scope of the appended claims.

What is claimed is:

1. A stackable portable engine mounting stand for supporting an engine above a flat surface the stand comprising:

a pair of vertically disposed front legs, each leg having top and bottom ends, a pair of vertically disposed rear legs each leg having top and bottom ends, roller means attached to the bottom ends of each leg to permit the legs to be rolled on the flat surface, fastening means to mount the rear of the engine to the rear legs, the fastening means comprising threaded fasteners passing through the rear legs and securely engaging a threaded passageway in the rear of the engine, a pair of angular arms, each arm having a proximate end and a distal end, the proximate end of each arm affixed to the front leg and the distal end adjacent to the engine, an angular plate mounted to the distal end and adapted to be fastened to the engine, and fastening means passing through the angular plate and received in the engine for fastening the plate to the engine.

2. The engine mounting stand of claim 1 wherein the angular plate is removable from the angular arm and can be replaced with another angular plate which is adapted for mounting to a different engine.

3. The engine mounting stand of claim 1 and further comprising spacer means located on the rear legs and disposed between the engine block and the rear legs to provide a clearance gap to accommodate an engine starter between the rear legs and the engine whereby the engine can be test started while mounted to the stand.

4. The engine mounting stand of claim 1 wherein the fastening means comprises threaded fasteners engaging a threaded passageway in the engine.

5. The engine mounting stand of claim 3 wherein the spacer means located on the rear legs are removable therefrom and can be replaced by other spacer means of different dimensions adapted for mounting to a different engine.

6. The engine mounting stand of claim 1 and further comprising a stationary engine mounting stand with means for stacking the stationary engine mounting stand on top of the portable engine stand whereby a second engine can be stacked above the first engine.

7. The engine mounting stand of claim 6 wherein the stationary engine mounting stand comprises:

a pair of vertically disposed front legs, each leg having top and bottom ends, the bottom ends adapted to be mounted on top of the vertically disposed front legs of the portable engine mounting stand, a pair of vertically disposed rear legs, each rear leg having top and bottom ends, the bottom ends adapted to be mounted on the top of the vertically disposed rear legs of the portable engine mounting stand, and means to attach the second engine to the vertically disposed legs of the stationary engine stand.

8. The engine mounting stand of claim 7 wherein the means to attach the engine to the legs comprises threaded fasteners passing through the rear legs and engaging a threaded passageway in the rear of the engine and threaded fasteners passing through the angular plate and engaging a threaded passageway in the engine block.

9. The engine mounting stand of claim 8 wherein the angular plate is mounted at an angle with respect to the vertical leg to permit it to lie substantially flush with the engine when mounted.

10. The engine mounting stand of claim 6 wherein the means for stacking the stationary engine mounting stand on top of the portable engine mounting stand comprises recessed areas on the bottoms of the front and rear legs of the stationary stand and locating posts on the tops of the front and rear legs of the portable stand, the locating posts adapted to be received by the recessed areas to restrain lateral movement of the stands with respect to each other.

11. The engine mounting stand of claim 6 and further comprising a second stationary mounting stand adapted for mounting on top of the stationary engine mounting stand whereby a third engine can be stacked above the first and second engines.

12. The engine mounting stand of claim 11 wherein the second stationary engine mounting stand comprises:
 a pair of vertically disposed front legs, each leg having top and bottom ends, the bottom ends adapted to be mounted on top of the vertically disposed front legs of the stationary engine mounting stand,
 a pair of vertically disposed rear legs, each rear leg having top and bottom ends, the bottom ends adapted to be mounted on the top of the vertically disposed rear legs of the stationary engine mounting stand, and
 means to attach the second engine to the vertically disposed legs of the stationary engine stand.

13. A portable engine mounting stand for supporting an engine comprising:
 a pair of vertically disposed front legs each having top and bottom ends,
 a pair of vertically disposed rear legs each having top and bottom ends,
 roller means attached to the bottom ends of each leg to permit the legs to be rolled along a floor;
 threaded fastening means passing through each of the rear legs and engaging, complementary threaded passageways in the rear of the engine for securely mounting the engine to the rear legs,
 an angular plate located at the top end of each of the front legs, the angular plate sloping with respect to the vertical front legs and adapted for mounting to the engine block,
 threaded fastening means passing through each angular plate and engaging complementary threaded passageways on the sides and towards the front of the engine for securely mounting the engine to the front legs.

14. The portable engine mounting stand of claim 13 wherein the angular plate is removable from the front legs and can be replaced with another angular plate which is adapted for mounting to a different engine.

15. The portable engine mounting stand of claim 14 and further comprising spacer means located on the rear legs and disposed between the engine block and the rear legs to provide a clearance gap to accommodate an engine starter between the rear legs and the engine whereby the engine can be test started while mounted to the stand.

16. The portable engine mounting stand of claim 15 wherein the spacer means located on the rear legs is removable therefrom and can be replaced with other spacer means of different dimensions adapted for mounting to a different engine.

* * * * *